UNITED STATES PATENT OFFICE.

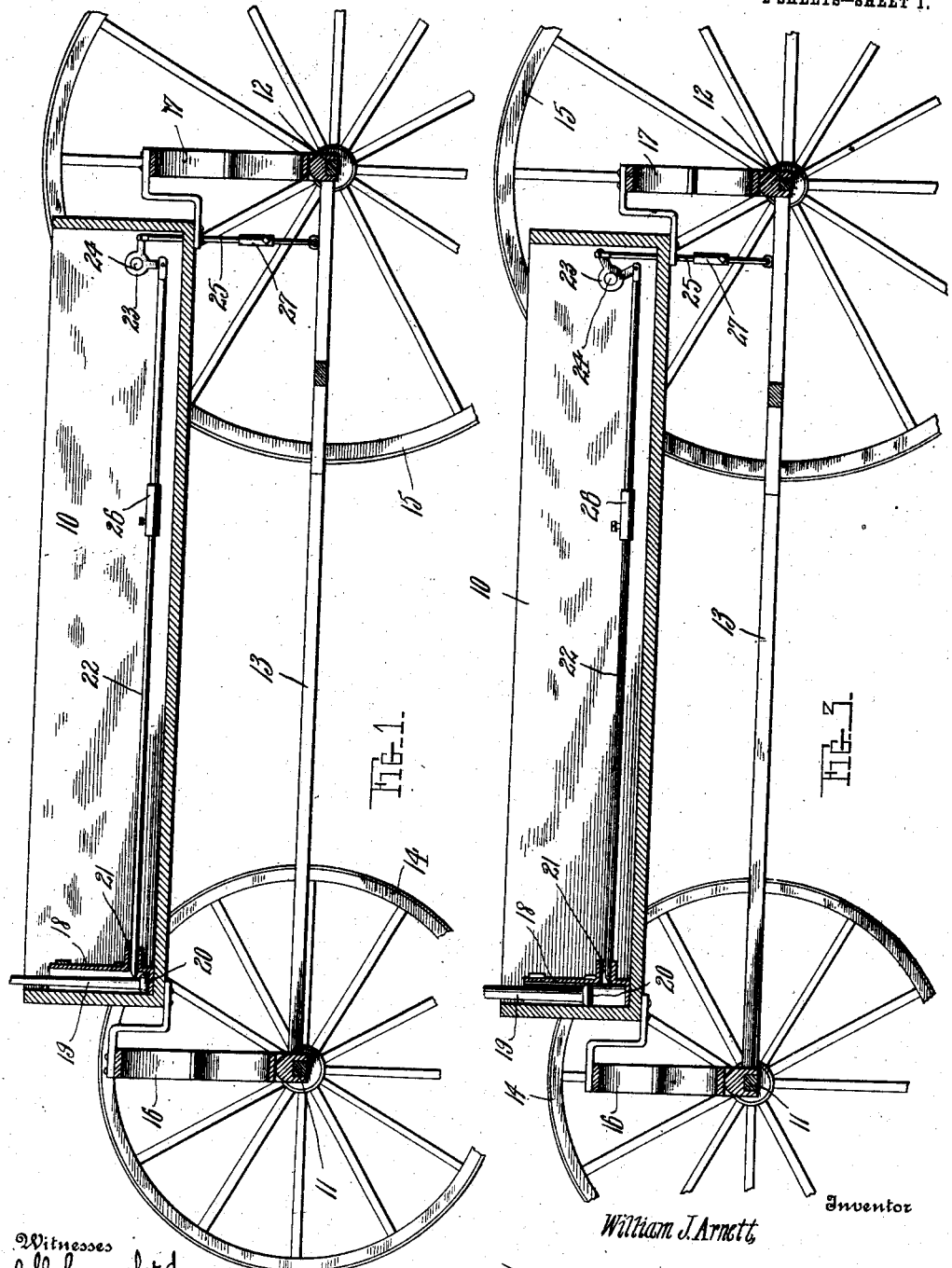

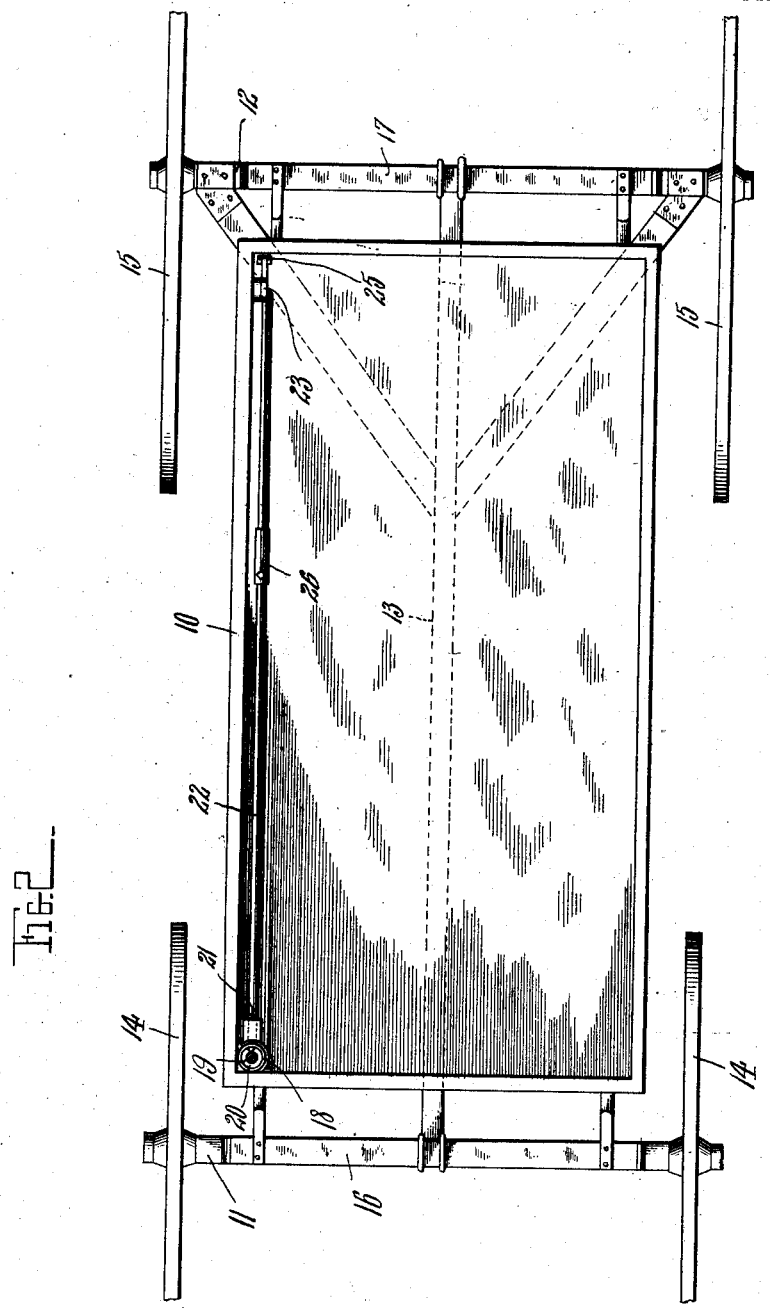

WILLIAM J. ARNETT, OF MARGERUM, ALABAMA.

WHIP-LOCK.

No. 902,129.  Specification of Letters Patent.  Patented Oct. 27, 1908.

Application filed April 29, 1908. Serial No. 429,900.

*To all whom it may concern:*

Be it known that I, WILLIAM J. ARNETT, a citizen of the United States, residing at Margerum, in the county of Colbert, State of Alabama, have invented certain new and useful Improvements in Whip-Locks; and I do hereby declare the following to be a full, clear, and exact description of the invention, such as will enable others skilled in the art to which it appertains to make and use the same.

This invention relates to attachments for vehicles for preventing the surreptitious removal of the whip in the absence of the driver, and has for one of its objects to provide a simply constructed device which will automatically lock the whip in a suitable socket when the occupant leaves the vehicle, and will automatically release the whip when the occupant returns to the vehicle.

The object of the invention is to provide a simply constructed means operative by the compression and expansion of the springs of the vehicle incident to the occupant mounting the vehicle or retiring therefrom, to release and lock the whip automatically by the act of the occupant mounting or dismounting from the vehicle.

With this and other objects in view the invention consists first in a suitably arranged socket for the whip, means between the socket and the running gear of the vehicle whereby the compression and expansion of the springs incident to the driver mounting the vehicle or dismounting therefrom will automatically release or lock the whip in the socket.

The invention further consists in certain novel features of construction as hereafter shown and described and then specifically pointed out in the claims, and in the drawings illustrating the preferred form of the invention, Figure 1 is a longitudinal sectional view of a conventional vehicle including the body, a portion of the running gear, and the springs with the improvement applied. Fig. 2 is a plan view of the same. Fig. 3 is a view similar to Fig. 1 with the parts in locking position.

The improved device may be applied to any of the various forms of vehicles having springs, but is more particularly applicable to buggies, and carriages of the various forms. For the purpose of illustration a conventional form of a vehicle is shown comprising a body 10, the running gear including the forward axle 11, the rear axle 12, and the reach elements 13, together with the forward wheels 14 and the rear wheels 15, the body 10 being connected to the running gear by the usual forward spring 16 and rear spring 17. These portions of the device may be of any form or style as the improvement is applicable to all the various styles of vehicles of this class without material structural change, and it is not therefore desired to limit the invention in any manner to any specific form of vehicle, but as the changes required to be made to adapt the invention to the different forms of vehicles are not material, it is not thought necessary to illustrate all the various forms of vehicles to which the device may be applied.

The improved device comprises a whip socket 18, of any approved form which is adapted to receive the butt end 19 of a whip, the butt end provided with a lateral enlargement or knob 20. The butt end of the whip is adapted to be inserted into the socket 18 with the enlarged end 20 bearing upon the bottom of the socket, and formed through the side of the socket is an aperture 21 through which one end of a rod 22 extends and adapted when in its inward position to bear against the whip body 18 above the projection 20, and thus lock the whip removably in the socket.

Disposed at some point in the body, preferably at the rear end, is a bell-crank lever 23 pivoted at 24 to the body, and connected by one of its arms to the rear end of the rod 22. Connected between the other arm of the lever 23 and the running gear, preferably to the reach element 13, is a rod 25. The rods 22—25 will be provided respectively with adjusting means 26—27, so that their lengths may be altered to enable them to be operated with accuracy. The rods 22—25 will be so adjusted as to length that when the body 10 is without a passenger, the spring 16—17 will be distended and thus maintain the rod 25 in its elevated position, and likewise dispose the crank arm 23 in position to maintain the rod 22 in its operative position in engagement over the projection 20 of the butt of the whip, and thus lock the whip in its socket. Then when the driver mounts the body, his weight will depress the springs and carry the body downward and thus cause the rod 25 to reverse the position of the crank arm 23 and withdraw the rod 22 and release the whip. Thus the whip will remain in removable position relative to the socket so long as the driver occupies the vehicle, but when the driver dismounts, the release of the load from the springs will cause them to expand, and thus operate the mechanism and again lock the whip into its socket.

It will be obvious that the crank arm 23 and the rod 25 may be applied to any portion of the running gear, but will preferably be applied near the rear axle, as shown, as the mechanism is less in the way of other parts of the vehicle in this part and is also more liable to be concealed from observation by persons who have designs on the whip.

While the mechanism shown is the preferred form of the embodiment of the invention, it is not desired to be limited thereto, as changes in the form and minor details of construction may be made to adapt the device to various forms of vehicles without departing from the principle of the invention, or sacrificing any of its advantages within the scope of the appended claims.

What is claimed, is:—

1. The combination with a vehicle including the body, running gear, and springs between the body and running gear, of a socket to receive the whip, a whip having a lateral projection at the butt end and engaging said socket, and means operative by the running gear for locking said whip within said socket when the springs are in distended position and to release the whip when the springs are compressed by the weight of the person in the vehicle.

2. The combination with a vehicle including the body, running gear, and springs between the body and running gear, of a socket, a whip detachably engaging said socket, and a locking means between the running gear and the socket and operating to engage the whip when the springs are distended and to release the whip when the springs are compressed.

3. The combination with a vehicle including the running gear, body and springs between the running gear and body, of a socket for receiving the whip carried by the body, a whip having a lateral projection at the butt end and engaging said socket, a rod movably disposed in said body and adapted to engage said whip when in one position, and connecting means between said rod and the running gear, whereby said rod is projected into said socket and engaged with said whip when the springs are distended and withdrawn from the socket and the whip released when the springs are compressed.

4. The combination with a vehicle including the body, running gear, and springs between the body and running gear, of a socket for the whip carried by the body, a whip having a lateral projection, a bell-crank lever connected to said body, a rod pivoted at one end to one end of said bell-crank lever and with the other end protruded into said socket and adapted to engage above the protuberance on the whip, and a rod connected at one end to the other end of said bell-crank lever and at the other end to said running gear, whereby when the springs are depressed by the load disposed within the body the rod will be withdrawn and release the whip, and the rod projected into the socket and locking the whip therein when the load is removed from the body and the springs expanded.

In testimony whereof, I affix my signature, in presence of two witnesses.

WILLIAM J. ARNETT.

Witnesses:
J. B. PRIDE,
L. T. HARDCASTLE.